UNITED STATES PATENT OFFICE.

WILLIAM H. SIMMONS, OF SAN JOSE, CALIFORNIA, ASSIGNOR OF ONE-HALF TO HARLOW J. AYRES, OF SAME PLACE.

COMPOSITION FOR CLOSING PUNCTURES IN PNEUMATIC TIRES.

SPECIFICATION forming part of Letters Patent No. 680,420, dated August 13, 1901.

Application filed March 25, 1901. Serial No. 52,840. (No specimens.)

*To all whom it may concern:*

Be it known that I, WILLIAM H. SIMMONS, a citizen of the United States, residing at San Jose, in the county of Santa Clara and State of California, have invented certain new and useful Improvements in Compositions for Closing Punctures in Pneumatic Tires, of which the following is a specification.

My invention relates to a composition for automatically closing and sealing punctures in pneumatic tires for bicycles, automobiles, or vehicles in general.

It consists of the following ingredients in the proportions stated: crude petroleum-oil, two-thirds of a gallon; liquid asphalt prepared from asphaltic petroleum, one-third of a gallon; balsam of fir, four ounces; white lead ground in linseed-oil, one pound; any good make of varnish, two ounces; castor-oil, one ounce; raw linseed-oil, one-half ounce; olive-oil, one and one-fourth ounces. These ingredients are mixed at a temperature of from 120° to 180° of heat, being stirred continually while mixed.

In the place of the castor-oil, raw linseed-oil, and olive-oil any essential oil may be used, the object of the oil being to prevent the other ingredients of the composition from evaporating and becoming hard.

This composition is adapted only for single-tube tires and is applied from the outside of the tire by injecting it through the valve-stem. It is then worked around, so as to be distributed equally throughout the whole inner surface of the tube. The proper amount to use is one-fourteenth of a gallon for the average size of tire—that is to say, one and one-half inches in diameter and twenty-eight-inch wheel.

The composition will remain soft and viscous for an indefinite period, and when the tire is punctured the composition will flow out through the orifice and will automatically seal and close the same.

The coating of this composition will not hinder a workman in the repair of large holes, cuts, or tears, but will rather be of assistance to him, as it closes small imperfections in his work.

This composition is not affected by extremes of temperature or weather and can be used in any climate.

I claim—

1. The herein-described composition of matter consisting of crude petroleum-oil, liquid asphalt prepared from asphaltic petroleum, balsam of fir, white lead, and an oil, substantially in the proportions specified.

2. The herein-described composition of matter consisting of crude petroleum-oil, liquid asphalt prepared from asphaltic petroleum, balsam of fir, white lead, varnish, and an oil, substantially in the proportions specified.

3. The herein-described composition of matter consisting of crude petroleum-oil, liquid asphalt prepared from asphaltic petroleum, balsam of fir, white lead, varnish, castor-oil, raw linseed-oil, olive-oil, substantially in the proportions specified.

In witness whereof I have hereunto set my hand in the presence of two subscribing witnesses.

WILLIAM H. SIMMONS.

Witnesses:
FRANCIS M. WRIGHT,
Z. A. DANIELS.